United States Patent [19]

Wascat

[11] 4,432,486
[45] Feb. 21, 1984

[54] DEVICE FOR BRINGING INTO REGISTER THE CIRCULAR END SECTION OF A CYLINDRICAL ELEMENT WITH THE CIRCULAR SECTION OF A CYLINDER BOTTOM, WITH A VIEW TO ASSEMBLY THEREOF BY WELDING

[75] Inventor: Raymond Wascat, Cuffies by Soissons, France

[73] Assignee: Bignier Schmid-Laurent, France

[21] Appl. No.: 226,606

[22] Filed: Jan. 21, 1981

[30] Foreign Application Priority Data

Jan. 28, 1980 [FR] France ................................ 80 01729

[51] Int. Cl.³ ............................................ B23K 37/04
[52] U.S. Cl. ................................................. 228/49 A
[58] Field of Search ................. 228/4.1, 6 R, 15, 44.5, 228/47, 48, 49; 29/464, 240; 15/347, 352

[56] References Cited

U.S. PATENT DOCUMENTS

| 3,080,843 | 3/1963 | Abbott et al. | 29/240 X |
| 3,633,813 | 1/1972 | Looney | 228/41 |
| 3,634,648 | 1/1972 | Morris et al. | 228/48 X |
| 3,734,387 | 5/1973 | Sannipoli | 228/48 X |
| 3,888,103 | 6/1975 | Renshaw | 72/399 |
| 4,025,034 | 5/1977 | Randolph et al. | 228/48 X |

FOREIGN PATENT DOCUMENTS 617218  7/1978  U.S.S.R. ................................ 228/48

Primary Examiner—Nicholas P. Godici
Assistant Examiner—M. Jordan
Attorney, Agent, or Firm—Thomas J. Greer, Jr.

[57] ABSTRACT

The invention relates to a device for bringing into register the circular end section of a cylindrical element with the circular end section of a cylinder end, with a view to assembly thereof by welding, the cylindrical element presenting an axis of revolution and comprising a receiving end adapted to receive the cylinder bottom, the device comprising a frame defining a track; a stop fixed to the frame; a bottom-carrying carriage movable on the track; a cylinder-carrying carriage movable on the track between the fixed stop and the bottom-carrying carriage; and a carriage supporting a member for radially tightening the receiving end of the cylindrical element, this carriage being movable on the track between the cylinder-carrying carriage and the bottom-carrying carriage. The invention is applicable to the manufacture of containers.

5 Claims, 4 Drawing Figures

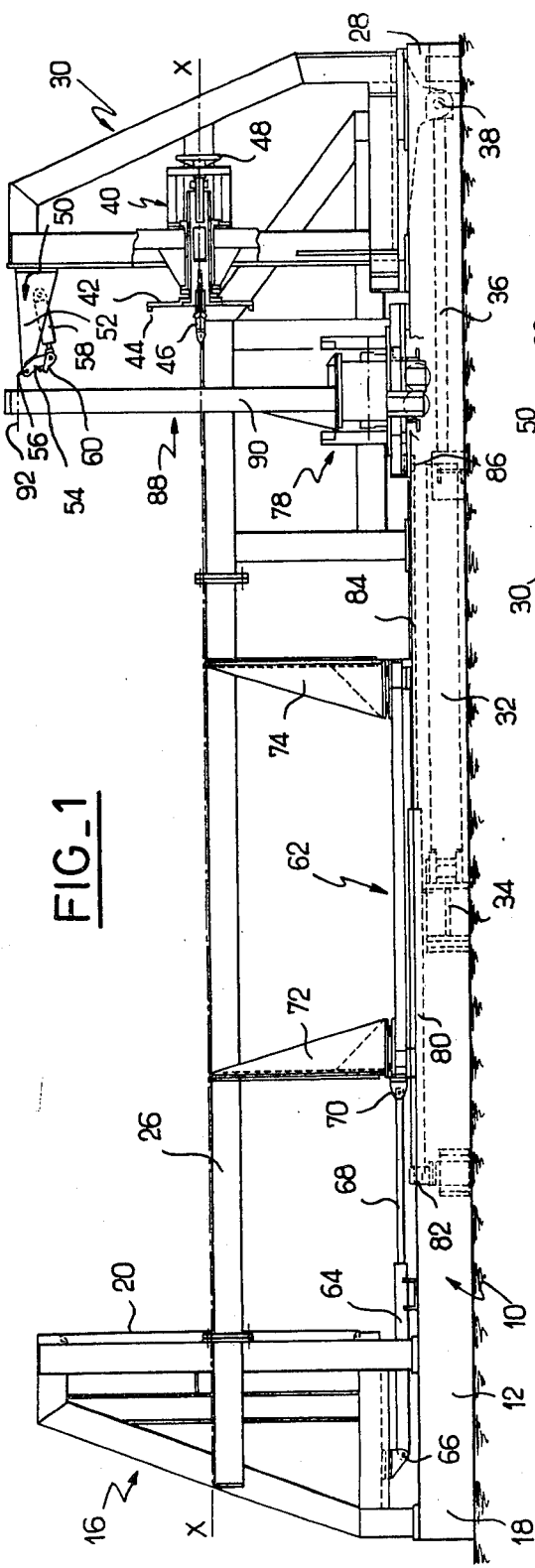
FIG_1
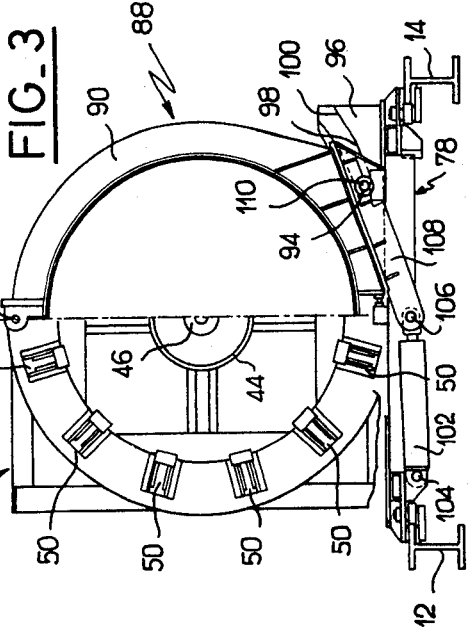
FIG_3
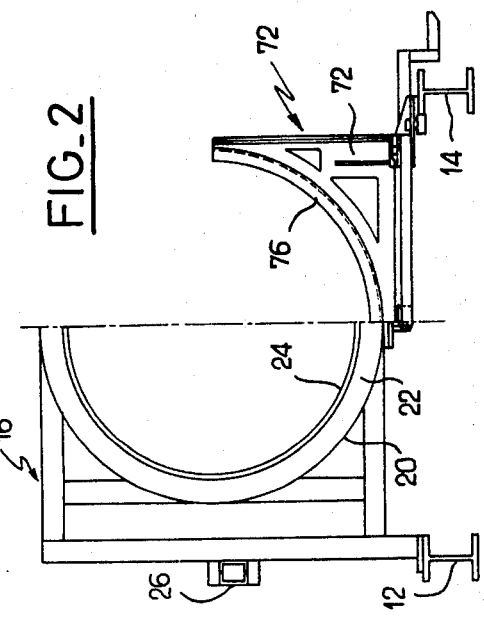
FIG_2

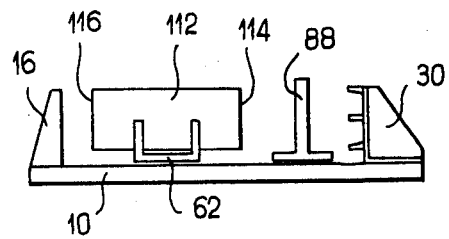
STEP 1
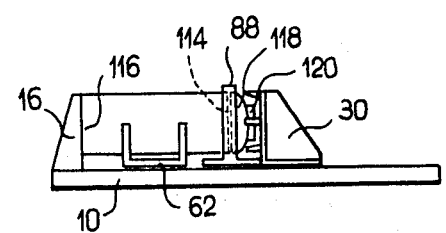
STEP 5
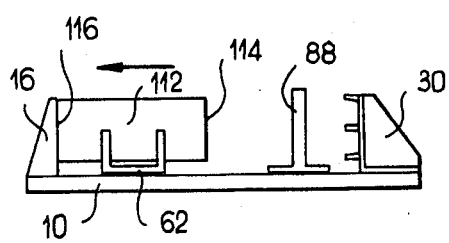
STEP 2
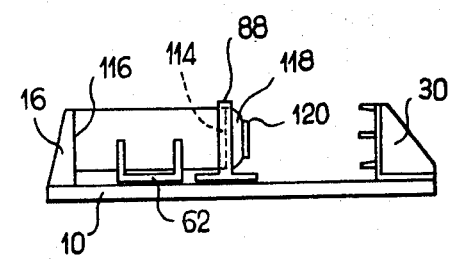
STEP 6
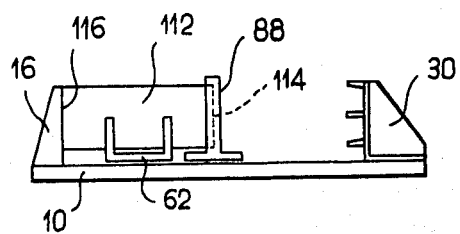
STEP 3
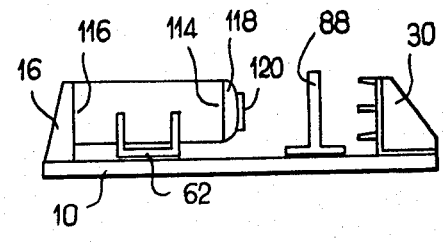
STEP 7
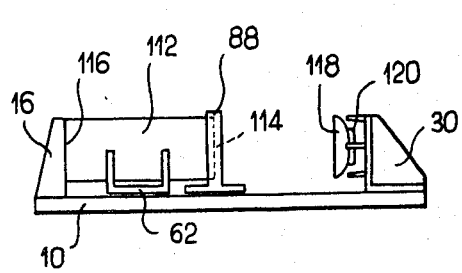
STEP 4
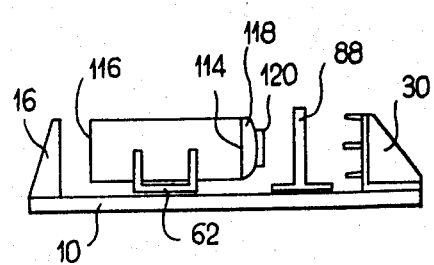
STEP 8
FIG_4

DEVICE FOR BRINGING INTO REGISTER THE CIRCULAR END SECTION OF A CYLINDRICAL ELEMENT WITH THE CIRCULAR SECTION OF A CYLINDER BOTTOM, WITH A VIEW TO ASSEMBLY THEREOF BY WELDING

The present invention relates to a device for bringing into register the circular end section of a cylindrical element with the circular section of a cylinder bottom, with a view to assembly thereof by welding.

It is more particularly applied to a cylindrical element having an axis of revolution and comprising a receiving end adapted to receive the cylinder bottom and an end which is opposite said receiving end and which is possibly also provided with a cylinder end. It thus makes it possible to position a first cylinder bottom on the first end of a cylindrical element and then to position a second cylinder bottom on the second end of the cylindrical element.

Cylindrical elements of this type are generally formed by sheets of stainless steel and are adapted to make containers or tanks.

Positioning of a cylinder bottom on a cylindrical element is a delicate operation as the circular end section of the cylindrical element must be brought into precise register with the circular section of the cylinder bottom to allow welding thereof.

This operation for bringing into register was heretofore essentially carried out by hand and its main drawbacks consisted in requiring a great deal of time and precision to obtain a precise register of the cylindrical element and of the cylinder bottom, compatible with the welding processes.

It is an object of the present invention to avoid this drawback by proposing a device for bringing into register rapidly and precisely.

The invention relates more particularly to a device for bringing into register the circular end section of a cylindrical element with the circular section of a cylinder bottom, said cylindrical element presenting an axis of revolution and comprising a receiving end adapted to receive the cylinder bottom and an end opposite said receiving end possibly provided with a bottom. This device makes it possible to carry out the steps of moving the cylindrical element in the direction of its axis of revolution until said opposite end comes into abutment on a fixed stop; partially engaging around the receiving end of the cylindrical element a radial tightening member adapted to be tightened around this end; moving the cylinder end in the axis of the cylindrical element and engaging it in the radial tightening member; tightening the radial tightening member; and applying a pressure on the bottom to bring the circular section of the receiving end into register with the circular section of the cylinder bottom with a view to welding thereof.

The tightening step of the radial tightening member and the pressure applying step advantageously consist in effecting a partial tightening of the radial tightening member around the receiving end and the cylinder bottom, in exerting an overall pressure on the bottom, in effecting a complete tightening of the radial tightening member around the receiving end and the cylinder bottom and in exerting a pressure on the periphery of the cylinder bottom.

According to another feature of the invention, the cylinder bottom is held by means of a retaining member and this holding action is stopped after the radial tightening member is completely tight and before exerting the pressure on the periphery of the cylinder bottom.

The device of the invention further advantageously carries out the additional steps of loosening the radial tightening member and in moving it out of the receiving end; moving the cylindrical element and the bottom to cease abutment on the stop; and evacuating the cylindrical element and bottom, possibly to bring another bottom in register on the opposite end of the cylindrical element.

The device according to the invention comprises a frame defining a track; a stop means fixed on the frame; a bottom-carrying carriage movable on the track; a cylinder-carrying carriage movable on the track between the fixed stop means and the bottom-carrying carriage; a carriage supporting a member for radially tightening the receiving end of the cylindrical element, this carriage being movable on the track between the cylinder-carrying carriage and the bottom-carrying carriage.

According to another feature of the device of the invention, the stop means comprises a ring adapted to allow the abutment of the opposite end of the cylinder, this opposite end possibly being provided with a bottom and in this case supported on a semi-elastic annular bevel of the ring.

The bottom-carrying carriage is advantageously provided with a gripping assembly adapted to hold the cylinder bottom and with a plurality of simultaneously controlled pressure members, disposed concentrically around the gripping member and each comprising a rocking lever adapted to exert a pressure on the periphery of the bottom.

The bottom-carrying carriage is more particularly provided to receive a bottom pierced with a central orifice, the gripping assembly then comprising a retaining element adapted to be introduced in this orifice and then actuated to hold the bottom by the inside.

The gripping assembly is advantageously mounted elastically on the bottom-carrying carriage.

According to another feature of the invention, the radial tightening member is constituted by two half-rings having one end articulated on a common pin and another end in abutment on a guide, a jack being connected to the lower end of each half-ring to tighten or loosen same.

The invention will be more readily understood on reading the following description with reference to the accompanying drawings, in which:

FIG. 1 is a view in elevation of a device according to the invention.

FIG. 2 is a half-view to the left of the fixed stop means of the device of FIG. 1 and a half-view to the right of one of the cradles of the cylinder-carrying carriage of the device of FIG. 1.

FIG. 3 is a half-view to the left of the bottom-carrying carriage of the device of FIG. 1 and a half-view to the right of the radial tightening member of the device of FIG. 1.

FIG. 4 schematically illustrates the different steps of bringing into register a cylindrical element and a cylinder bottom by means of the device of FIGS. 1 to 3.

Reference will now be made to FIGS. 1 to 3 to describe a preferred embodiment of the device according to the invention.

The device shown in FIGS. 1 to 3 comprises a fixed frame 10 constituted by two I-sections 12 and 14 disposed parallel and horizontally so as to constitute a track. These two sections 12 and 14 are suitably braced so as to constitute a rigid beam adapted to absorb the efforts coming into play in the device.

The device further comprises a stop means 16 fixed on the end 18 of the frame 10 which is found on the left-hand side of FIG. 1. This stop means 16 is constituted by a plurality of beams assembled together to absorb the considerable forces coming into play during operation of the device, as will be explained hereinafter. This stop means 16 is provided with a ring 20 placed vertically with its centre on the horizontal axis XX of FIG. 1 (cf. FIGS. 1 and 2). This ring comprises a flat annular portion 22 adapted to serve as stop for the circular end section of a cylindrical element, or cylinder, and also comprises a semi-elastic annular bevel 24 adapted to serve as support for the convex bottom welded on the end of a cylindrical element.

The semi-elastic annular bevel 24 is made of an elastomer material.

The device further comprises two lateral reinforcing beams such as 26 of which one end is fixed on the fixed stop means 16 and of which the other end is fixed on the end 28 of the frame opposite the end 18.

The device further comprises a bottom-carrying carriage 30 adapted to receive a cylinder bottom and movable on the track, near the end 28 of the frame, under the action of a displacement jack 32 of which the body is fixed at 34 on the frame 10 and the rod 36 is articulated at 38 on the carriage 30.

The carriage 30 is provided with a gripping assembly 40 mounted thereon and in axis XX. This gripping assembly 40 is adapted to hold a cylinder bottom of convex form, provided with a central orifice. This gripping assembly comprises a support element 42 presenting a circular lip 44 adapted to be applied to the outside of a cylinder bottom and a retaining element 46 disposed in the axis XX and adapted to be actuated by a pneumatic jack. This retaining member 46 is adapted to be introduced in the central orifice of a cylinder bottom and then to be actuated by the pneumatic jack so as to cooperate with the interior of the bottom to apply this bottom against the lip 44, thus holding it elastically on the carriage 30.

The gripping assembly 40 comprises a screw-nut adjusting device 48 enabling the circular lip 44 to be suitably positioned with respect to the pressure members 50 described hereinafter, as a function of the different types of cylinder bottoms.

The carriage 30 is also provided with a plurality of pressure members such as 50, for example 12 in number, disposed concentrically around the gripping assembly 40 (cf. FIGS. 1 and 3). Each pressure member 50 comprises a support 52 fixed on the carriage 30, a rocking lever 54 articulated at 56 on the support 52 and a hydraulic jack 58 articulated between the support 52 and the rocking lever 54. The pressure members 50 are controlled simultaneously and each present a support surface 60 adapted to be applied on a cylinder bottom when the jacks 58 are actuated.

The device further comprises a cylinder-carrying carriage 62 movable on the track, between the stop means 16 and the carriage 30, under the action of a displacement jack 64 of which the body is articulated at 66 beneath the stop 16 and of which the rod 68 is articulated at 70 on the carriage 62. The carriage 62 comprises two semi-circular cradles 72 and 74 mounted semi-elastically on the latter and adapted to receive a cylindrical element placed horizontally with its axis of revolution in coincidence with the axis XX of FIG. 1. The two cradles 72 and 74 are each provided with a semi-circular lining which may be replaced as a function of the diameter of the cylinder carried by the carriage. Thus, as shown in FIG. 2, the cradle 72 comprises a semi-circular lining 76 provided for a cylinder of determined diameter.

The device of the invention further comprises a carriage 78 movable on the track, between the cylinder-carrying carriage 62 and the bottom-carrying carriage 30, under the action of a displacement jack 80 of which the body is articulated at 82 on the frame 10 and of which the rod 84 is articulated at 86 on the carriage 78.

The carriage 78 supports a radial tightening assembly 88 constituted by two half-rings such as 90 of which one of their ends, namely the top end, is articulated on a common pin 92 and of which the lower end is in abutment via a roller 94 on an outwardly raised guide 96 presenting two successive ramps 98 and 100. The two half-rings are each actuated by a jack such as 102, placed in tandem and articulated at 104 on the frame 10 and at 106 on a control rod 108 itself articulated at 110 on the lower end of the half-ring 90.

When the jacks 102 are extended, the rollers 94 of the two half-rings follow the two successive ramps 98 and 100, at the same time causing the two half-rings to open. The ramps 98 and 100 are determined so that, when the roller 94 moves on the ramp 98, the pivot pin 92 remains fixed and, when it moves on the ramp 100, the pin 92 moves upwardly and enlarges the opening between the half-rings, facilitating the introduction of the radial tightening member 88 around the receiving end of the cylinder, as will be explained hereinafter.

When the jacks 102 are retracted, the two half-rings move towards each other in the opposite direction.

The radial tightening member 88 is provided for a given diameter of cylinder and may be replaced by a similar member of different dimensions in the case of a cylinder of different diameter being treated.

This radial tightening member makes it possible, when it is tightened around the cylinder ends and bottom, to give the assembly a perfectly circular form and thus ensure perfect register for assembly by weld spots.

The functioning of the device will now be described with reference to FIG. 4.

A cylindrical element, or cylinder, 112 is deposited by means of a jib (not shown) horizontally on the cylinder-carrying carriage 62 so that the end 114 of the cylinder, or receiving end, which has to receive a cylinder bottom, is directed towards the tightening member 88 and the opposite end 116 is directed towards the stop means 16 (step 1).

The carriage 62 is then moved in the direction of the stop means 16 by actuating the jack 64 so that the end 116 of the cylinder 112 comes into abutment on the stop means 116 (step 2).

The radial tightening member 88 is then loosened so as to open the half-rings and it is moved, under the action of the jack 80, in the direction of the end 114 of the cylinder 112 so as partially to engage the tightening member 88 around the end 114 of the cylinder (step 3).

After having suitably positioned the gripping assembly 40 with the aid of the screw-nut adjustment device 48, depending on the design of the cylinder bottom, a cylinder bottom 118 of convex shape, provided with a cylindrical skirt 120 and presenting a central orifice (not shown) is then positioned by actuating the retaining element 46 of the bottom-carrying carriage 30 so that it passes through said central orifice and is then retained therein to effect the elastic assembly of the bottom 118 on the bottom-carrying carriage 30 (step 4).

The bottom-carrying carriage 30 is then moved in the direction of the cylinder 112 by actuating the jack 32 so that the cylinder bottom 118 partially engages inside the radial tightening member 88.

The radial tightening member 88 is then partially tightened by simultaneously acting on the two jacks 102 so as to obtain a good concentricity of the cylinder and the bottom. The displacement of the bottom-carrying carriage 30 in the direction of the cylinder 112 is terminated by acting on the jack 32, until the circular section of the cylindrical bottom 118 is effectively in abutment on the circular section of the end 114 of the cylinder 112.

The jack 32 which may have, for example, a force of 5 tons, enables the cylinder bottom 118 to be brought roughly in register with the end 114 of the cylinder 112.

The ring 88 is then completely tightened by acting on jacks 102 so that the end 114 and the bottom 118 both present a perfect circular section opposite each other.

The retaining element 46 is actuated so that it no longer exerts any holding action on the cylinder bottom 118.

The twelve pressure members 50 are then actuated so as to exert considerable pressure on the whole periphery of the bottom 118 and thus promote the bringing into register of the circular section of the end 114 and the circular section of the cylinder bottom 118. This important operation makes it possible to eliminate, due to the efforts coming into play, any residual deformations which might remain after the first bringing into register.

The bottom 118 may then be spot welded on end 114 (weld spots of variable spacing depending on the thicknesses to be welded) from the inside, the pressure always being maintained due to the pressure members 50.

Spot-welding is carried out internally, which will subsequently allow a complete welding at the line of join between the two circular sections.

Once the spot welding is terminated, the pressure on the bottom 118 is removed by retracting all the jacks 58 simultaneously and the bottom-carrying carriage 30 is moved towards the right so as to move it away from the cylinder (step 6).

The tightening member 88 is loosened and is moved towards the bottom-carrying carriage 30 (step 7).

The cylinder-carrying carriage 62 is moved so that the end 116 of the cylinder 112 is no longer in abutment on the stop means (step 8).

The cylinder-cylinder bottom assembly may be evacuated or turned on the carriage 62, i.e. placed on the carriage again with the bottom 118 opposite the stop means 16, so as to bring into register and spot weld a cylinder bottom on the end 116, following the above steps 1 to 7.

The spot welding thus effected makes it possible to carry out, under the best conditions, the complete welding operation with processes known per se, for example of the plasma type.

The invention is not limited to the embodiment which has been specifically described and shown and other variants may be made without departing from the scope of the invention.

What is claimed is:

1. Device for bringing into register the circular end section of a cylindrical element with the circular section of a cylinder bottom, said cylindrical element presenting an axis of revolution and comprising a receiving end adapted to receive the cylinder bottom, the device comprising, a frame defining a track, a stop means fixed on the frame, a bottom-carrying carriage movable on the track, a cylinder-carrying carriage movable on the track between the fixed stop means and the bottom-carrying carriage, and a carriage supporting a radial tightening member adapted to be simultaneously tightened around the receiving end of the cylindrical element and the end of the bottom, the radial tightening member being constituted by an assembly of two half-rings the top ends of which are articulated on a common pin and the lower ends of which are in abutment and supported for movement by means of a roller on an outwardly raised guide, and a jack being connected to the lower end of each half-ring to tighten and loosen same, the carriage supporting the tightening member being movable on the track between the cylinder-carrying carriage and the bottom-carrying carriage.

2. The device of claim 1, wherein the stop means comprises a ring adapted to support the opposite end of the cylindrical element.

3. The device of claim 1, wherein the bottom-carrying carriage is provided with a gripping assembly adapted to hold the cylinder end, the gripping assembly having a plurality of simultaneously controlled pressure members disposed concentrically therearound and each comprising a rocking lever adapted to exert a pressure on the periphery of the bottom.

4. The device of claim 3, wherein the bottom-carrying carriage is adapted to receive a bottom provided with a central orifice, the gripping assembly comprising a retaining element adapted to be introduced into the orifice and then actuated to hold the bottom from inside.

5. The device of claim 1 wherein the outwardly raised guide includes two different guide portions, whereby the half-rings are moved in two steps, one in which the common pin at the top of the two half-ring assembly remains fixed, the other in which the common pin moves upwardly upon opening the half-rings to enlarge the opening therebetween for receiving a cylinder.

* * * * *